Aug. 25, 1970   J. A. W. KAEDING ET AL   3,525,437
APPARATUS FOR SEPARATING SOLIDS FROM LIQUIDS
AND FOR THICKENING SLUDGES
Filed April 18, 1968
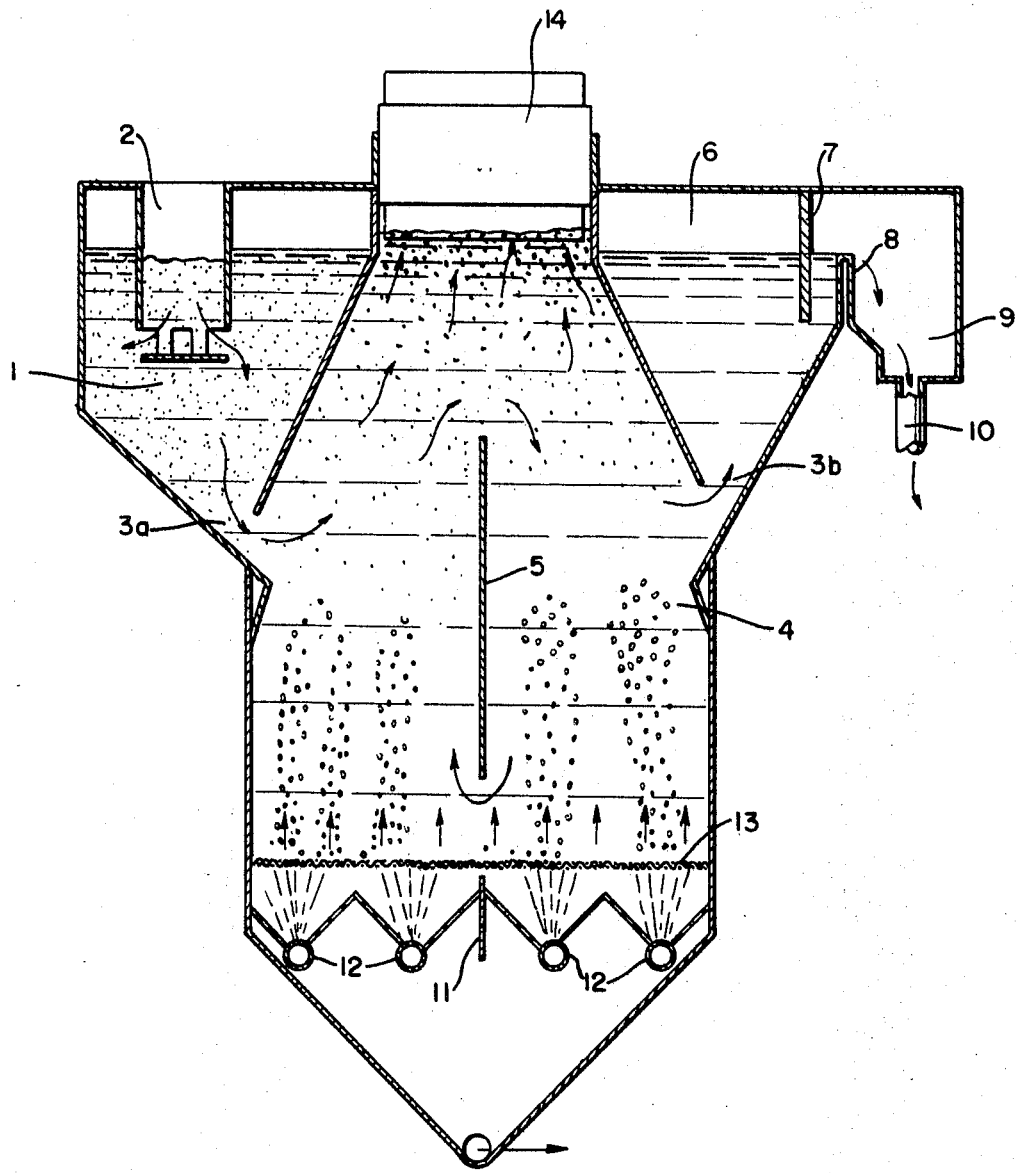
INVENTORS
J.A. W. KAEDING
W.A. GRUNERT United States Patent Office 3,525,437
Patented Aug. 25, 1970

3,525,437
APPARATUS FOR SEPARATING SOLIDS FROM
LIQUIDS AND FOR THICKENING SLUDGES
Joachim A. W. Kaeding, Berlin, and Willy A. Grunert, Coswig, Germany, assignors to Institut fur Wasserwirtschaft, Berlin, Germany
Filed Apr. 18, 1968, Ser. No. 722,343
Int. Cl. B03d 1/02, 1/24
U.S. Cl. 210—221
4 Claims

ABSTRACT OF THE DISCLOSURE

A floatation process and apparatus for separating solids from liquids and for thickening sludges. The treated liquid may be water or waste water, and it is initially subject to a resting action so as to reduce its speed of flow. Then the water is subjected in a floatation cell to aeration, so that solids will float on the surface of the liquid in the aeration cell, and these solids can be removed from the surface of the liquid in the floatation cell. Clear water is discharged through a discharge chamber which communicates with the floatation cell. At its inlet a resting chamber communicates with the floatation cell, and this cell tapers in an upward direction in the region of its upper end while at a lower region an aerating means communicates with the cell to direct small air bubbles upwardly through the liquid therein to bring about floatation of the solids at the upper part of the floatation cell from where the solids can be withdrawn by a suitable conveyor.

BACKGROUND OF THE INVENTION

The present invention relates to a process and apparatus for separating solids from liquids as well as for thickening sludges, having a small amount of solids therein, by way of floatation, as is particularly encountered in the treatment of water or waste water.

As is well known, it is possible to separate suspended solids by sedimentation, particularly where the solids are in the nature of a flock, as for example in the case of activated sludge having a water content of 99% and more. The further treatment of the sludge requires a large amount of space for drying beds. Mechanical dewatering methods may advantageously have thickeners for pretreating the water. Also, it is known that solids can be separated by floating thereof according to a floatation process with shorter dwelling periods as compared to the settling periods required in suitable settling tanks or in thickeners. The sludge which is achieved by floatation has a higher content of solids than a sludge achieved by sedimentation.

In the floatation of materials which are not crystalline in nature, particularly materials which have a flock type of structure, technical expedients are used which differ from those used, for example, in ore floatation. The treatment must be very carefully carried out. If the liquid flows too vigorously, the flock components will be broken up into small aggregations and their capability of floating is not assured. This disadvantage can, within certain limits, be compensated for by the addition of flocking chemicals, accumulators and foaming agents as well as by the addition of flocking medium or changing the pH value.

Also, there are methods where the floatation of solids, particularly with flock properties, is achieved under vacuum, or by feeding a solution, under air pressure or enriched with gas, the floatation is brought about by extremely fine gas bubbles which form in the vacuum or by the release of the pressure of the gas which enriches the solution, or by electrolysis.

With the known pressure floatation methods, the treated solution or a part thereof is directed through a pressure vessel or hydrodynamic generator before entering into the floatation cell.

In general, rectangular pans or vats of small depth serve as floatation cells, although circular pans are also partly used. These methods are accompanied by certain disadvantages. The enriching of the entire solution with air or a gas results, in pumps and feed conduits for the liquid, in speeds of flow and turbulent streams which lead to breaking up of the flock type of components and render the floatation thereof difficult to carry out. In the floatation cells larger aggregations must first be formed to make it possible for the solids to cling to the air bubbles. This disadvantage can be compensated within certain limits by the addition of floatation chemicals.

With another type of known floatation method it is necessary to mix with the main stream an auxiliary stream which is enriched with air or gas. In order in this case to avoid undesirable hydraulic flow characteristics, extremely elongated floatation cells are primarily used, and at the inlet side of these cells part of the stream is introduced through a distributing structure, such as for example, a perforated pipe situated beneath the feed of the primary stream. The result is that because of the superposition of the horizontal through-flow component with the vertically rising air bubbles, these latter air or gas bubbles, during their upward movement, move through a long inclined path which is not straight up. The extremely fine flock can form into larger aggregations in the region of the inlet and only receive an upward driving force by clinging to air bubbles in a section of the floatation cell which is situated further downstream. As a result the full effectiveness of the air bubbles is not assured, since between the inlet of the water under pressure and the discharge which is situated opposite the inlet the density of the bubbles continuously diminishes.

SUMMARY OF THE INVENTION

It is a primary object of the present invention to provide a process and apparatus which will avoid the above drawbacks.

In particular, it is an object of the invention to provide a process and apparatus which will increase the effectiveness of floatation.

Also, it is an object of the invention to provide a process and apparatus which at the same time will have wide field of use, preferably in water treatment fields.

In particular, it is an object of the invention to provide a floatation process and apparatus for separating solids from liquids as well as for thickening sludges while carrying out the floatation steps in a simple manner and in a technically rational sequence and while at the same time maintaining the known floatation principles in a modified form.

With the method of the invention the liquid which is to be treated is initially subjected to a resting action where its speed of flow is reduced so that it is even possible for a certain amount of sedimentation to take place, and then the thus-rested liquid is introduced into a floatation cell which at its lower region communicates with aerating means directing air bubbles upwardly through the body of liquid in the floatation cell so that solids float to the top of the surface of the body of liquid therein. A discharge chamber situated at the side of the floatation cell opposite from the resting chamber is provided for discharging clear liquid from the floatation cell. This floatation cell tapers upwardly at its upper region where at the top surface of the liquid a conveyor is provided for carrying away the floating solids.

BRIEF DESCRIPTION OF DRAWINGS

The invention is illustrated by way of example in a schematic manner in the drawing which accompanies this application and forms a part thereof and in which one possible floatation apparatus of the invention for carrying out the process of the invention is shown in a schematic elevation.

DESCRIPTION OF PREFERRED EMBODIMENTS

The liquid which is to be treated and which has a small amount of solids therein is introduced into a resting chamber before being fed into a floatation cell, so that in this way the speed of flow of the liquid is sharply reduced. In the floatation cell, the floatation process is carried out by way of vertical aeration, and the floating solids are thickened in an upper portion of the floatation cell. These solids which are thus separated and thickened are removed by way of suitable structure which carries them away, and the clear water is directed to a discharge chamber having a clear water outlet. By the addition of chemicals, for instance polyamide or polyacrylate, before or in the resting chamber, the liquid which is to be treated can be activated, and in this way the floatation in the floatation cell is improved. The liquid which is to be treated is introduced into the floatation cell 4 beneath the surface of the body of liquid therein. By way of a regulated vertical aeration, which can take place in some cases over only a part of the cross section of the floatation chamber, it is possible to achieve a circulation of the liquid around a partition 5 which is built into the floatation cell.

With the structure of the invention the floatation cell 4 has the resting chamber 1 situated at the inlet side of the floatation cell 4 and at the outlet side thereof is the discharge chamber 6 for the clear water, these chambers 1 and 6 communicating directly with the floatation cell 4. The floatation cell 4, the resting chamber 1, and the discharge chamber 6 form a single constructive unit of very small size.

The floatation cell 4 is provided in a lower region with a pressurized water inlet 12 as well as with a mesh structure 13 situated thereover so as to reduce turbulence resulting from the introduction of the pressurized water, this mesh structure 13 extending over the entire cross section of the cell. In the ground of the cell is an outlet.

The floatation cell 4 is of a tapered configuration at its upper region, preferably by having its side walls upwardly inclined toward each other, to form in this way a tapered hood which brings about a further thickening of the floating solids. These side walls of the floatation cells 4 are respectively formed with an inlet opening 3a for the liquid which is to be treated, as required by the operations, as well as with a discharge opening 3b for the discharge of the clear water, and these openings 3a and 3b extend for the most part over the entire width of the floatation cell. Within the floatation cell 4 there may be a partition 5 which is centrally mounted in the cell, and at the region of the pressurized water feed 12 there is a partition plate 11 for controlling the feed over the entire cross sectional area or over only a part thereof.

In order to remove the thickened floating solids, a removing means 14 is mounted on the floatation cell 4. The resting chamber 1 and the discharge chamber 6 can both be of the same configuration and size and are arranged in the mirror-image fashion with respect to the central axis of the floatation cell 4.

The resting chamber 1 as well as the discharge chamber 6 have in cross section a trapezoidal configuration and are elongated at their lower portions by way of inclined walls which extend into the side walls of the floatation cell 4 through the inlet 3a in the case of chamber 1 and the outlet 3b in the case of chamber 6.

In order to regulate the elevation of the surface of the liquid there is situated either within the discharge chamber 6 or outside at the clear water outlet 9 an interchangeable and adjustable weir 8.

The floatation cell 4 can be formed by a pair of identical constructive bodies or of bodies which are stepped in cross section, in such a way that a return flow of the treated liquid either into the inlet or into the outlet is not possible.

With the invention several advantages are achieved. Thus, there is a reliable floating separation and enriching of the suspended solids, particularly solids of flock properties, accompanied by the smallest speeds of flow within the floatation cell 4. With the structure of the invention it is possible for larger aggregations of fine suspended solids to form. Also, a high floatation output is achieved by way of the manner in which the liquid flows through by the feeding of the pressurized water.

Also, the additional thickening effect achieved for the floating solids before removal thereof is of considerable advantage.

Where the structure has a rectangular cross section, the installation can be expanded by additional units which are arranged parallel to each other and one behind the other, in accordance with the assembly of prefabricated components.

In the particular example shown in the drawing the liquid which is to be purified is assumed to be impure water having suspended solid impurities therein. The structure primarily includes three main components, namely, the resting chamber 1, the floatation cell 4, and the discharge chamber 6, these three main components together forming a single operating constructive unit of the smallest possible size. At the inlet side of the flotation cell 4 is the resting chamber 1, while at the outlet side thereof the discharge chamber 6 is located. As is indicated in the drawing, both of these latter chambers can be arranged in mirror-image fashion with respect to the central axis of the flotation cell 4, and these chambers may have the same shape and size so as to facilitate interconnection of a series of prefabricated units. As was indicated above, the pressurized water feed structure 12 is situated in the region of the lower end of the floatation cell 4 which is of rectangular cross section, and over the water feed 12 is situated the flow-smoothing grid or mesh structure 13, which substantially reduces any possible turbulence from the water fed through the feed structure 12. Thus, the mesh structure 13 preferably is in the form of a screen or grid of small, narrow mesh which extends completely across the entire base carrier of the flotation cell and which gives to the pressurized water issuing upwardly from the feed 12 a vertical flow direction within the floatation cell 4. The feed water unit 12 can be divided into a pair of chambers by the partition 11. Also, the interior of the floatation cell 4 can be provided with the vertical partition wall 5 which, when required, provides for a circulating flow of the treated liquid. The side walls of the floatation cell 4 are inclined upwardly toward each other at the upper region of the floatation cell and serve in this way to increase the thickening effect. Furthermore, it is these side walls which are formed with the inlet opening 3a and the outlet opening 3b in the form of elongated horizontally extending slots which extend throughout the entire width of the floatation cell.

The resting chamber 1, which is of trapezoidal configuration in section, is provided with a distributing trough 2 through which the water is introduced, and at its lower portion the chamber 1 has a downwardly inclined wall which extends into the floatation cell 4 through the inlet 3a along the lower edge of the latter, as schematically indicated in the drawing.

At the discharge chamber 6 there is a wall 7 which extends into the liquid beneath the surface thereof so as to hold back any solid particles which may happen to float on the liquid in the chamber 6, and also there is the weir 8 which is adjustable in elevation so as to regulate the elevation of the body of liquid in the floatation cell 4, this weir 8 being built into the structure. The discharge chamber 6 is provided with a clear water outlet 9 which feeds the clear water to the discharge conduit 10.

In order to remove the floating solids at the top end of the floatation cell 4, where it tapers upwardly to its smallest area, a removing structure 14, taking the form, for example, of an endless conveyor band, is arranged over the entire width of the floatation cell with the endless band carrying flights, buckets, or the like which engage the solids and remove them from the floatation cell.

The water which is to be treated is introduced into the structure through the distributing trough 2, and within the distributing trough accumulator and/or forming agents may be supplied, if required, in common with the water. From the distributing trough 2, the water flows freely into the resting chamber 1. This chamber 1 has the purpose of reducing and preventing longitudinal and transverse currents in the introduced liquid, so as to provide a resting thereof, and in this way when the liquid reaches the floatation cell 4 the only forces acting thereon effectively are the forces resulting from the pressure at the head of the liquid. In addition, with this arrangement sufficient time is gained to enable the agents, which are added to assist in the floatation, to take effect on the impurities of the water. Thus, for this latter purpose the resting chamber 1 serves at the same time as a reaction chamber. If it should happen that there is some extent of separation of solids by sedimentation within the chamber 1 as a result of the dwelling of the liquid therein, the settled solids will simply slide down the lower inclined wall of the chamber 1 into the floatation cell 4 so as to be involved in the floatation process which takes place therein.

The water itself flows in a non-turbulent smooth manner through the inlet opening 3a beneath the surface of the body of water within the floatation cell 4 into the latter where the floatation process, which is to say the floating of the solids to the surface of the body of liquid in the cell 4, is carried out. In addition, at the region of the lower end of the floatation cell 4 there is the feeding of a water-air mixture throughout the entire cross section of the floatation cell in a manner according to which the feeding of this mixture is uniformly distributed throughout the cell, with the upwardly flowing pressurized water from the feed structure 12 having its speed of flow reduced by the mesh structure 13 or a similar structure which also serves to reduce or prevent turbulence so that the presence of turbulent currents is greatly reduced or eliminated to achieve in this way a uniform vertical rising of extremely fine bubbles. The very finely distributed gas bubbles cling to the solid particles and carry them along to the upper surface of the body of liquid in the cell 4 in order to enrich the body of liquid in the cell 4 at the surface of the liquid with a floating sludge.

Thus, the medium which carries and raises the solid particles to the surface of the body of liquid in the cell 4 is a water-air mixture such as water which has been enriched with air, this mixture being introduced through the pressurized water feed 12. This pressurized water feed 12 itself takes the form of a number of pipes which are formed within the floatation cell 4 with a multiplicity of openings of slots. When the water-air mixture discharges from the pipes of the structure 12, expansion takes place. The extremely fine air bubbles which form are the carriers for the floating particles. The arrangement of the openings at the pipes of the feed structure 12 through which the air-water mixture enters is such that the tiny air bubbles are distributed throughout the entire cross section of the floatation cell.

The feeding of the water-air mixture takes place from both sides of the cell 4. Thus, it is possible to operate the cell 4 either from one side only or from both sides in accordance with the requirements of a particular operation. For this reason the floatation cell is provided over the mesh structure 13 with the partition 5 and beneath the mesh 13 with the partition 11 which with partition 5 is fixed in a stationary manner within the cell. Operation of the cell from one side only does not in any way detract from the effectiveness of the floatation process. When the cell is operated from both sides the partition 5 acts as a guide wall in order to enable the floatation to be carried out in a circulating manner. For this purpose the feed water structure 12 is shut off on one side.

The floatation method itself is carried out in the manner described above. It is further influenced and improved by way of the upwardly tapering configuration of the floatation cell 4, this arrangement providing a further thickening of the floating solids before they are removed. The water which has been cleared of the suspended solids is removed at an elevation which is approximately ⅔ of the height of the floatation cell 4. Any tiny solid particles which happen to be carried along with the removed clear liquid are prevented from discharging from the chamber 6 by the wall 7 which extends into the body of clear liquid from the top surface thereof. By way of the interchangeable weir 8 which is adjustable in elevation the throughflow amount can be adjusted so as to be adapted to the height of the body of liquid and the level at which the floating sludge is located can be regulated, this floating sludge being removed, after corresponding thickening thereof, by way of the removing means 14. The body of clear water within the chamber 6 rises and flows from the latter to the outlet 9. From the outlet 9 the water is transported through a conduit 10 from which part of the water may be fed back along a suitable branch conduit to provide for a circulating type of operation, this water which is fed back from the conduit 10 being saturated with air before being delivered under pressure through the water feed structure 12.

What is claimed is:

1. In an apparatus for separating solids from a liquid, a floatation cell having an inlet opening and an opposed outlet opening for providing a horizontal flow of said liquid through said cell, a resting chamber for receiving said liquid to be treated, said resting chamber communicating with said cell at said inlet opening thereof, a discharge chamber communicating with said cell at said outlet opening thereof for discharging clear liquid therefrom, said floatation cell having a lower region and also having an upper region over said lower region, said upper region tapering upwardly and forming a collection chamber for floating solids, said resting chamber and discharge chamber being adjacent to opposite tapering sides of said upper region, each chamber having a downwardly inclined bottom wall and forming substantially a mirror image of each other with respect to a central axis of said cell, and aerating means communicating with said lower region for vertically aerating liquid in said cell.

2. The combination of claim 1 and wherein a mesh means is situated in said cell directly over said aerating means for reducing creation of turbulence by said aerating means.

3. The combination of claim 1 and wherein a wall is situated in said discharge chamber extending into the liquid therein and wherein an interchangeable weir is situated in said discharge chamber and is adjustable in elevation therein.

4. In an apparatus for separating solids from a liquid, a floatation cell having an inlet side and an opposed discharge side, a resting chamber for a liquid to be treated, said resting chamber communicating with said cell at said inlet side thereof, a discharge chamber communicating with said cell at said outlet side thereof for discharging clear liquid therefrom, said floatation cell and chambers forming a single unit having a lower region and also having an upper region over said lower region, said upper region tapering upwardly and forming a collection chamber for floating solids, and aerating means communicating with said lower region for aerating liquid in said cell, said cell further including a central, substantially vertical partition in its interior, and a second partition at the elevation of said aerating means in said lower region.

References Cited

UNITED STATES PATENTS

| | | | |
|---|---|---|---|
| 1,201,934 | 10/1916 | Callow | 209—170 |
| 1,296,190 | 3/1919 | Hyde | 209—170 X |
| 1,441,560 | 1/1923 | Connors | 209—170 X |
| 3,032,199 | 5/1962 | Sumiya | 209—170 |

MICHAEL E. ROGERS, Primary Examiner

U.S. Cl. X.R.

209—170; 210—44, 10, 261